United States Patent

Chang et al.

[11] Patent Number: 5,342,054
[45] Date of Patent: Aug. 30, 1994

[54] GOLD PRACTICE APPARATUS

[75] Inventors: Philip L. Chang, San Bruno; Gary S. Flood, Saratoga; Kent W. Kirkes, Palo Alto; Edwin R. Smith, San Jose, all of Calif.

[73] Assignee: Timecap, Inc., Sunnyvale, Calif.

[21] Appl. No.: 37,089

[22] Filed: Mar. 25, 1993

[51] Int. Cl.$^5$ ............................................... G06F 15/44
[52] U.S. Cl. ........................... 273/186.1; 273/35 R; 273/183.1; 273/187.1; 273/184 R; 434/252; 364/410
[58] Field of Search ............ 273/176 R, 183.1, 185 A, 273/185 B, 186.1, 35 R, 184 R, 187; 434/247, 252, 257; 364/410

[56] References Cited

U.S. PATENT DOCUMENTS

| | | | |
|---|---|---|---|
| 4,150,825 | 4/1979 | Wilson | 273/185 B |
| 4,160,942 | 7/1979 | Lynch et al. | 273/183.1 X |
| 4,751,642 | 6/1988 | Silva et al. | 364/413 |
| 4,970,652 | 11/1990 | Nagashima | 364/449 |
| 5,056,791 | 10/1991 | Poillonet et al. | 273/185 B |
| 5,102,140 | 4/1992 | Vincent | 273/176 A |
| 5,160,839 | 11/1992 | Nishiyama et al. | 250/222.1 |
| 5,184,295 | 2/1993 | Mann | 364/410 |
| 5,210,603 | 5/1993 | Sabin | 358/93 |
| 5,221,082 | 6/1993 | Curchod | 293/185 A |
| 5,249,967 | 10/1993 | O'Leary et al. | 434/247 |

Primary Examiner—Jessica J. Harrison
Assistant Examiner—Kerry Owens
Attorney, Agent, or Firm—John J. Leavitt; William A. Blake

[57] ABSTRACT

A golf practice apparatus provides recording and instant playback of video images of a golfer's swing. A plurality of color video cameras are preferably employed to obtain video images of a swing from different angles. A video processing and storage unit digitally stores the images in memory for instant replay. Image processing and recording is automatically initiated when a golf ball is placed on a designated hitting area through the use of an infrared camera and image processing software that detects a golf ball in the IR camera's image. The IR camera is also used in conjunction with an IR flash unit to obtain snapshot images of a club head and ball just before and just after the golf club hits the ball. An optical sensor array is positioned adjacent the hitting area to detect the passage of a golf club toward the ball. The signals generated by the optical sensor array are employed by the image processing and storage unit to both calculate the club speed and control triggering of the flash unit. A touch screen input and display monitor unit are positioned adjacent the hitting area for both the entry of commands and the display of the obtained images. Various display modes can be selected and the images obtained by all of the cameras can be displayed simultaneously if desired along with calculated statistical data on club speed, ball speed and ball angle. A video tape recorder can also be provided to record the images both as they are obtained by the cameras, and as they are played back by the video processing and storage unit.

18 Claims, 10 Drawing Sheets

GOLD PRACTICE APPARATUS

BACKGROUND OF THE INVENTION

Over the last two decades, the game of golf has increased in popularity throughout the United States and many foreign countries. There are now more than 25 million golfers in the United States alone and leisure-time golfers represent the vast majority of them. Most golfers play the game with insufficient frequency to realize improvement in their golf scores. Golf is a very competitive sport and most golfers, professionals and teachers of the sport are always trying to find ways to lower their scores, and in the case of instructors, trying to find better methods for instructing students. There are many golf facilities, outdoor and indoor driving ranges, training schools, etc. which provide professional instruction, practice space and training equipment so that the golfer is provided a means of improving his skill without going out on the golf course.

Many types of facilities exist which provide some type of instruction and swing training equipment. Outdoor driving ranges provide space so that a golfer can hit balls and view the flight of the ball and it's ultimate position after hitting. In addition, they provide instruction services, and in some cases provide swing analysis equipment which typically check club speed, ball speed and club path angle. Others sometimes provide video taping of a golfer's swing for post session visual feedback. Indoor driving ranges provide basically the same types of services except balls are hit into nets or cages. In this case the actual distances and direction of the ball can not be determined through observation. Golf training facilities come in various sizes having combinations of outdoor or indoor training services. In addition, there are facilities in which indoor simulators provide golfers a means of playing a simulated game of golf, thereby eliminating the need for large outdoor space.

Golf swing analysis apparatus presently available provides data on club speed, ball speed and club path which is typically presented in graphical or text format. Many facilities offer video camcorders which can be used to record a golfers ewing. These camcorders are operated with standard video recorders which require mechanical rewinding of the tape before replay. This limits the response time for the user, thereby decreasing the efficiency of training. Instructors using commercially available equipment can waste valuable time manipulating the video equipment. To adequately provide the golf student with proper instruction and feedback, the instructor must utilize combinations of swing analyzers and video cameras, recorders and monitors to effectively teach students how to accomplish the golf swing. An instructor must be knowledgeable in the use of the constantly changing "Hi Tech" equipment to provide quality video feedback teaching time.

There exists a need to integrate cameras, recorders, processors and monitors to provide an apparatus that instructors, students and professional golfers can operate easily to provide swing analysis images and data instantaneously that are easy to understand.

SUMMARY OF THE INVENTION

The present invention fulfills this need by providing an apparatus for obtaining and storing video images and statistical data of a golfer's swing which can be instantly reviewed for analysis by the golfer. In its broadest form, the invention comprises a video camera system for obtaining one or more video images of a golfer's swing, a video image processing and storage system for digitizing and storing the video images and a touch screen input and video display unit for both controlling operation of the apparatus and displaying stored images.

A golf mat is provided having a hitting area (preferably with a tee) for receiving a golf ball. An optical sensor array is disposed in or on the mat adjacent the tee for detecting passage of a golf club head. In addition to the video camera system, an infrared (IR) camera is positioned above the golf mat and an IR flash unit is aimed at the ball hitting area, both of which are also coupled to the video image processing and storage system.

In operation, the IR camera is first used to feed an image of the golf tee to the processing and storage system which then determines when a golf ball is placed on the tee using image processing techniques. When a ball is detected on the tee, the processing and storage system automatically begins storage of video images from the video camera system. The IR camera and flash unit are then employed to obtain snapshots of the golfer's ewing both just before and Just after the club head strikes the ball. The use of IR frequency light insures that the flashes will not be visible and therefore distracting to the user. The IR flash unit is triggered in response to club speed computation software which employs the outputs generated by the optical sensor array to determine the club speed, and then determines the appropriate flash times from the club speed.

The video image data is preferably stored in a circular buffer memory having enough storage space for storing the video data of a complete swing by the golfer. To reduce the necessary storage space, a video data compression/decompression circuit is preferably employed. Use of the circular buffer configuration provides virtually instantaneous review of the stored video data since the starting location of the video data can be quickly located in memory.

Upon completion of the golfer's swing, the image processing and storage system ceases storage of the video data from the video camera system and the IR camera, and then the golfer can selectively display the various stored images, as well as calculated statistical data on club speed, ball speed and ball angle. The swing can be reviewed at different speeds including stop motion and reverse and viewed from any or all camera angles. In addition, a video tape recorder and microphone are provided which enable the video images to be transferred either directly from the video and IR cameras or from the computer memory to video tape along with associated audio for subsequent home viewing by the golfer.

BRIEF DESCRIPTION OF THE DRAWINGS

The features, advantages and objects of the present invention will become apparent from the following detailed description of a preferred embodiment thereof, taken in conjunction with the accompanying drawings in which.

DETAILED DESCRIPTION OF THE PREFERRED EMBODIMENTS

Figure 1:
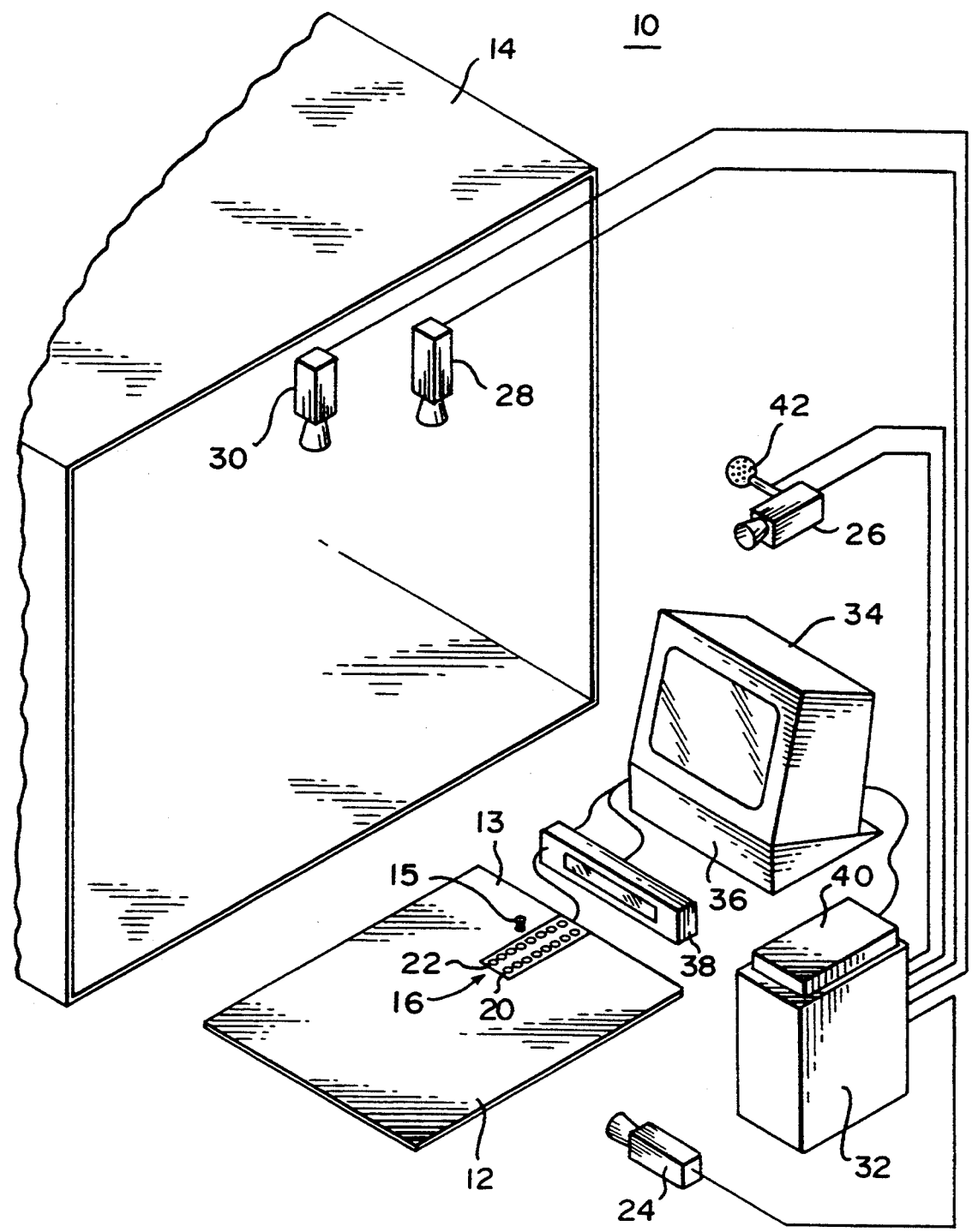
FIG. 1 is a diagrammatic perspective illustration of an apparatus constructed in accordance with the preferred embodiment of the invention.

Turning now to a more detailed consideration of a preferred embodiment of the present invention, FIG. 1 illustrates a golf practice apparatus 10 for either indoor or outdoor use which includes a golfing mat 12 with a hitting area 13 and a cage 14 for catching driven golf balls. If desired, a golf ball tee 15 is positioned on the mat 12 in the hitting area 13. Disposed on, or embedded in, the mat 12 adjacent to or on one side of the hitting area 13, is an optical sensor array 16 comprised of first and second columns 20 and 22 of photodetectors for sensing the passage of a golf club, as will be discussed in greater detail in conjunction with FIG. 3. Preferably, each column 20 and 22 includes 8 photodetectors.

A plurality of color video cameras 24, 26 and 28 are positioned by any suitable means (not shown) around the vicinity of the golfing mat 12 to obtain video images of any desired angles of the golfer during his or her swing. In the embodiment illustrated in FIG. 1, camera 24 obtains a side view, camera 26 obtains a front view and camera 28 obtains a top view. It will be understood that any number of video cameras can be employed at any desired angles, and that the three cameras shown in FIG. 1 are by way of example only. An infrared (IR) camera 30 is positioned near the top view camera 28 which generates an infrared image of the hitting area 13 of the golf mat 12.

The video outputs from the color video cameras 24-28 and the IR camera 30, as well as the output from the optical sensor array 16 are connected to a computerized video image processing and storage system 32 to be discussed in greater detail with reference to FIG. 2. Also connected to the video processing and storage system 32 is a combination touch screen input and video display monitor unit 34 which is shown positioned on a triangular shaped base 36 for easy access and viewing by a golfer. In particular, the unit 34 is positioned so that a golfer can use the handle of a golf club to actuate the touch screen input (see FIG. 3 and associated description below). An IR flash unit 38 is also connected to the video processing and storage system 32 which is positioned adjacent, and aimed at, the hitting area 13 for stop motion imaging of the golf club and ball as described in greater detail below in conjunction with FIGS. 5–7. Finally, a video tape recorder 40 is connected to the video processing and storage system 32 which enables permanent storage on tape of the video images obtained by the various cameras, the statistical data computed by the system 32 and the audio recorded by a microphone 42. The microphone 42 is useful for recording the sounds of the golfer hitting the ball and comments or remarks made by the golfer and/or an instructor regarding the swing.

Figure 2:
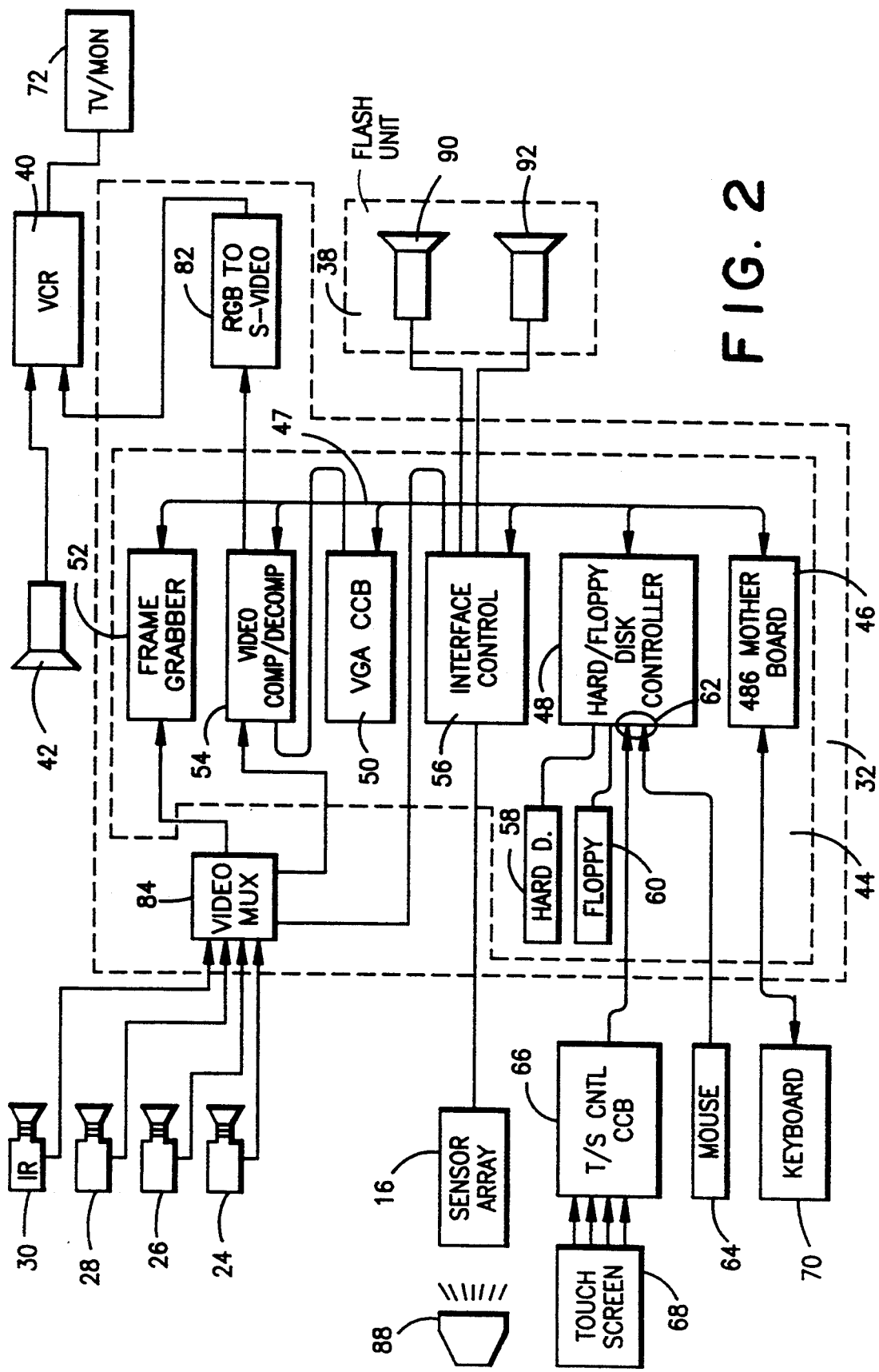
FIG. 2 is a block diagram of a video processing and storage system and its associated elements as used in the preferred embodiment of the invention.

Turning now to FIG. 2, the video processing and storage system 32 and its relationship to the various elements of the apparatus 10 connected thereto are shown in greater detail. The block diagram of FIG. 2 can be broken down into six subsystems, each of which performs a specific task. These subsystems include a system controller 44 contained within the video processing and storage system 32, and subsystems for user interfacing, golf ball detection, golf club detection, swing capturing and video recording. Each of the subsystems will now be discussed in turn.

The first subsystem is the system controller 44, the heart of which is preferably an IBM compatible personal computer based on either the "386" or "486" microprocessor family. This is the preferable choice because of its low cost and worldwide support as shown by the variety of software and circuit card applications which are available. More specifically, the system controller 44 is comprised of a number of conventional PC elements including a motherboard 46 having any suitable amount of RAM, such as four megabytes installed thereon. Connected to the motherboard 46 through use of conventional connector slots thereon and a PC bus 47 are a number of circuit cards. These include a hard-/floppy disk controller card 48, a VGA video card 50, a video image frame grabber card 52, a video compression/decompression card 54 and an interface control card 56. The last three of these cards are special function cards which will be discussed in greater detail in conjunction with the other subsystems.

As is conventional, a hard disk drive 58 and a floppy disk drive 60 are connected to the hard/floppy disk controller 48. The controller 48 also includes a pair of serial data ports 62 to which are connected, a conventional mouse 64 and a touch screen control CCA 66 which receives inputs from a touch screen 68 that forms a first part of the touch screen input and video display monitor unit 34 of FIG. 1. Finally, a conventional keyboard 70 is also connected to the motherboard 46.

The purpose of the system controller 44 is to control the sequence of actions necessary to provide the user input/output interfacing, detection of the golf ball, the stop action "snapshot" picture capturing and replay, and the capturing in instant replay of the golfer's swing. This is accomplished through use of software for initialization and image processing, standard off the shelf "TARGA" software library routines to control the frame grabber card 52, proprietary software written by the manufacturer of the video compression/decompression card 54 and Microsoft Windows 3.1 software used as the operating system software to control disk/file access and display. A more detailed discussion of the system controller functions will be provided as the various other subsystems are described.

Figure 3:
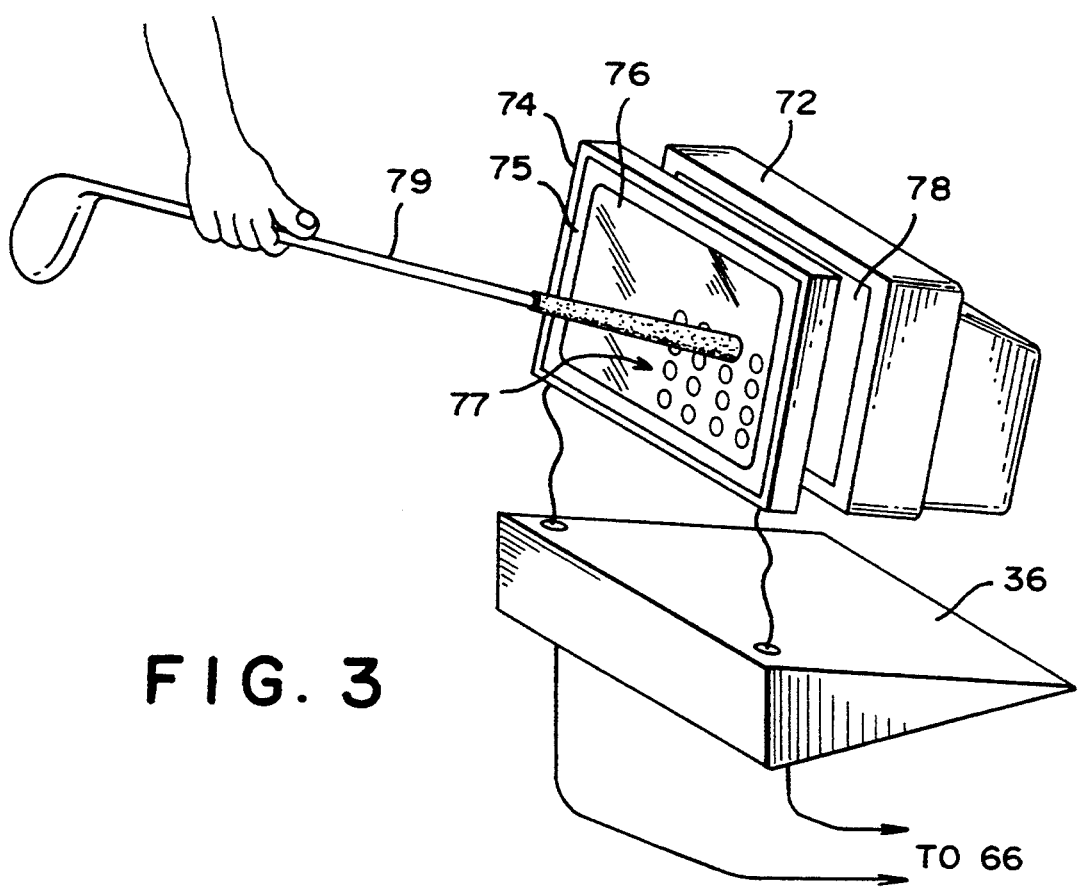
FIG. 3 is a diagrammatic perspective illustration of an input and display unit employed with the preferred embodiment of the present invention.

The user interfacing subsystem includes those elements necessary to interface with the golfer. These elements are the touch screen 68, the touch screen control CCA 66, a video monitor 72 which forms a second part of the touch screen input and video display monitor unit 34 of FIG. 1, the mouse 64 and the keyboard 70. As illustrated in FIG. 3, the touch screen 68 is of conventional construction, and is preferably made of an outer wood, plastic or metal frame 74 and a relatively thick (e.g., ¼ inch) Lexan (or other suitable material) screen 75 that is clear and strong enough to withstand golf ball impacts greater than 140 mph. The screen 75 is mounted over an inner frame 76 having a matrix 77 of photodetectors and LEDs formed in the lower right corner thereof. The touch screen 74 is mounted by any suitable means, such as Velcro, over a display screen 78 of the video monitor 72 so that the photodetector and LED matrix 77 overlays projected images of buttons in the lower right corner of the display screen 78 created by the VGA video card 50 and Microsoft Windows software.

As illustrated in FIG. 3, a golfer can conveniently select desired functions by placing the handle of a golf club 79 over the desired control button on the display screen 78. As is conventional, the photodetector and LED matrix 77 of the touch screen 68 detects the position of the golf club's handle, and sends this information to the touch screen control CCA 66. The information is then sent to the video image processing and storage system 32 which determines the identity of the selected function and executes the associated command.

Figure 4:
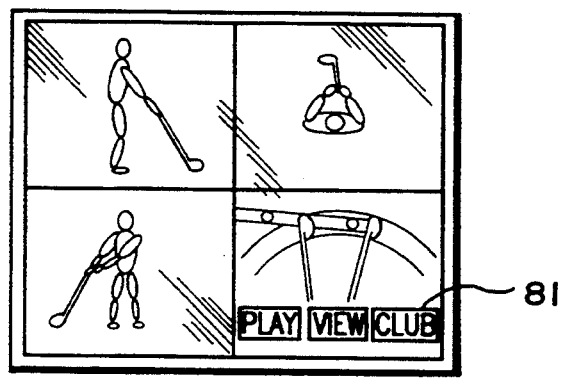
FIG. 4 is an illustration of one display mode provided by the preferred embodiment in which four separate views are simultaneously displayed.

FIG. 4 illustrates one display option in which four views are displayed simultaneously with the side view of the golfer obtained by the side view camera 24 being displayed in the upper left quadrant of the display screen 78, the front view obtained by the front view camera 26 being displayed in the lower left quadrant, the top view of the golfer obtained by the top view camera 28 being displayed in the upper right quadrant and the snapshot images obtained by the IR camera 30 being displayed in the lower right quadrant. In addition, a plurality of control buttons 81 are also displayed in the lower right quadrant.

Returning now to FIG. 2, the output from the VGA video card 50 goes into the video compression/decompression card 54 via a special connector known as the feature connector located on the VGA video card which is used to send digital RGB information to another card. The video information is overlayed on top of the compression/decompression card video information, and the combined video information (digital RGB) is routed to an "RGB-To-S-Video" converter 82. The S-video signal is then routed to the VCR 40 which passes the S-video signal to the video monitor 72. In operation, the VCR is normally in the recording mode for the full duration of the golfer's session. All video that the golfer sees on the monitor 72 is therefore also recorded on the VCR 40.

In addition to the touch screen control which is the primary interface for the golfer, the mouse 64 and keyboard 70 are also provided so that a software/field engineer or technician has the ability to communicate with the system controller to maintain, update and troubleshoot operational software and hardware.

The golf ball detection subsystem consists of the IR camera 30, a video multiplexer 84 and the frame grabber 52. By way of example, the video multiplexer 84 can be a Panasonic WJ 540 Quad Mux or compatibles, while the frame grabber 52 can be a Photomixer/TV or any TARGA 16 compatible card. These elements are used with the system controller 44 and the optical sensor array 16 of FIG. 1 to initialize the system's defaults for scale factors and digital threshold values, to determine if there is a golf ball on the designated hitting area 13 (qualification), to locate the golf ball in x-y coordinates after it as been qualified, to start swing storage mode and to find the x-y position of the ball after it has been hit.

As illustrated in FIG. 1, the IR camera 30 is positioned overhead above the golf mat 12 preferably 11 to 12 feet above the hitting surface. Preferably, the IR camera 30 is a conventional black and white camera having an infrared filter attached to the lens thereof. By using infrared flashes from the IR flash unit 38, the IR camera 30 can be employed to obtain stop action images of the golf club and ball during a golfer's swing. The use of infrared flashes is preferred since they are imperceptible to the golfer and therefore will not be distracting.

Returning now to FIG. 2, the video output from the IR camera 30 is fed tot he video multiplexer 84 which passes the video signal untouched onto the frame grabber 52. The frame grabber 52 captures in 512×512, 256×512 or 256×256 pixel modes. As is conventional, each pixel is represented by 16 bits in the TARGA 16 standard and the frame grabber captures 60 fields or 30 frames per second. The 512×512 capture mode is used to capture each field (even and odd) of the mat hitting area.

Using the 512×512 capture mode, the system controller program commands the frame grabber 52 to grab one frame (two fields). The frame grabber memory can be examined via the PC bus 47 by the C program module that determines the threshold levels and scale factor of the system. This C program module first totals up the number of occurrences of each level of the 32 levels of intensity to determine the average threshold value for the hitting area 13 of the golf mat 12. For example, if the golf mat 12 hitting area 13 is represented by 512×512 pixels and the green component has only 32 discrete levels, the C program module will total up the number of pixels in each level and then calculate a mean value that is used for setting threshold minimum and maximum values. Once the threshold has been calculated, the C program module then looks for the two columns of photodetectors 20 and 22 of the optical sensor array 16 and determines the x-y position of each of the photodetectors in the viewing area. The pixel distance between the two columns of photodetectors 20 and 22 is then calculated. Since the actual distance is a known parameter which is fixed when the optical sensor array 16 is constructed, the pixel scale factor can be determined from this information. Thus, if the two columns of photodetectors 20 and 22 are spaced from one another by 1.5 inches and it is determined that there are 30 pixels between two columns, then the scale factor would be 1.5/30=0.05 inches/pixel. The scale factor is then used to qualify a golf ball.

The frame grabber 52 is controlled by another C program module used to detect if a golf ball has been placed in the designated hitting area 13. The C program module tells the frame grabber 52 to grab the frame and then searches for an image pattern therein that has 32 pixels contiguous over threshold within some tolerance (e.g., plus or minus two pixels) to qualify a found golf ball. If the scale factor is 0.05 inches/pixel as discussed above and a standard golf ball is 1.62 inches in diameter, then the golf ball will cover approximately 32 pixels. If a golf ball is not found in the grabbed frame, another frame is grabbed and the process is repeated until either a ball is found or the golfer cancels the process. Once the ball is found, its x-y position is recorded and then another program routine is initiated to check to make sure the ball stays still for a predetermined time period, e.g. two seconds. Once the two second criteria is achieved, the system software goes into a swing storage/capturing mode.

Another C program module looks for a golf ball that has just been hit. Using basically the same criteria as before and a search patterned from left to right of the image where the golf club is going from right to left and thus the hit ball should be to the left of its initial position, the ball's x-y's position is determined. The ball's new position is then compared with its initial position to determine the ball's speed and flight angle. A "+" mark is put on the top of the ball image to inform the golfer that the system did find the hit ball, and that the calculated ball's speed and angle is correct. If the ball is not found, the "+" mark will not be displayed.

The golf club detection subsystem comprises the optical sensor array 16, a sensor lamp 88 for illuminating the optical sensor array 16, the interface control card 56 and the IR flash unit 38. The sensor lamp 88 can be a conventional spot or flood lamp, for example, and is preferably mounted 10 to 11 feet above the golf mat 12, and aimed at the two columns of photodetectors 20 and 22. Each of the photodetectors provides a digital output which is dependent on whether or not light from the sensor lamp 88 is blocked by the golf club head as it is being swung passed the sensor array 16 toward a golf ball in the designated hitting area 13.

Figure 5:
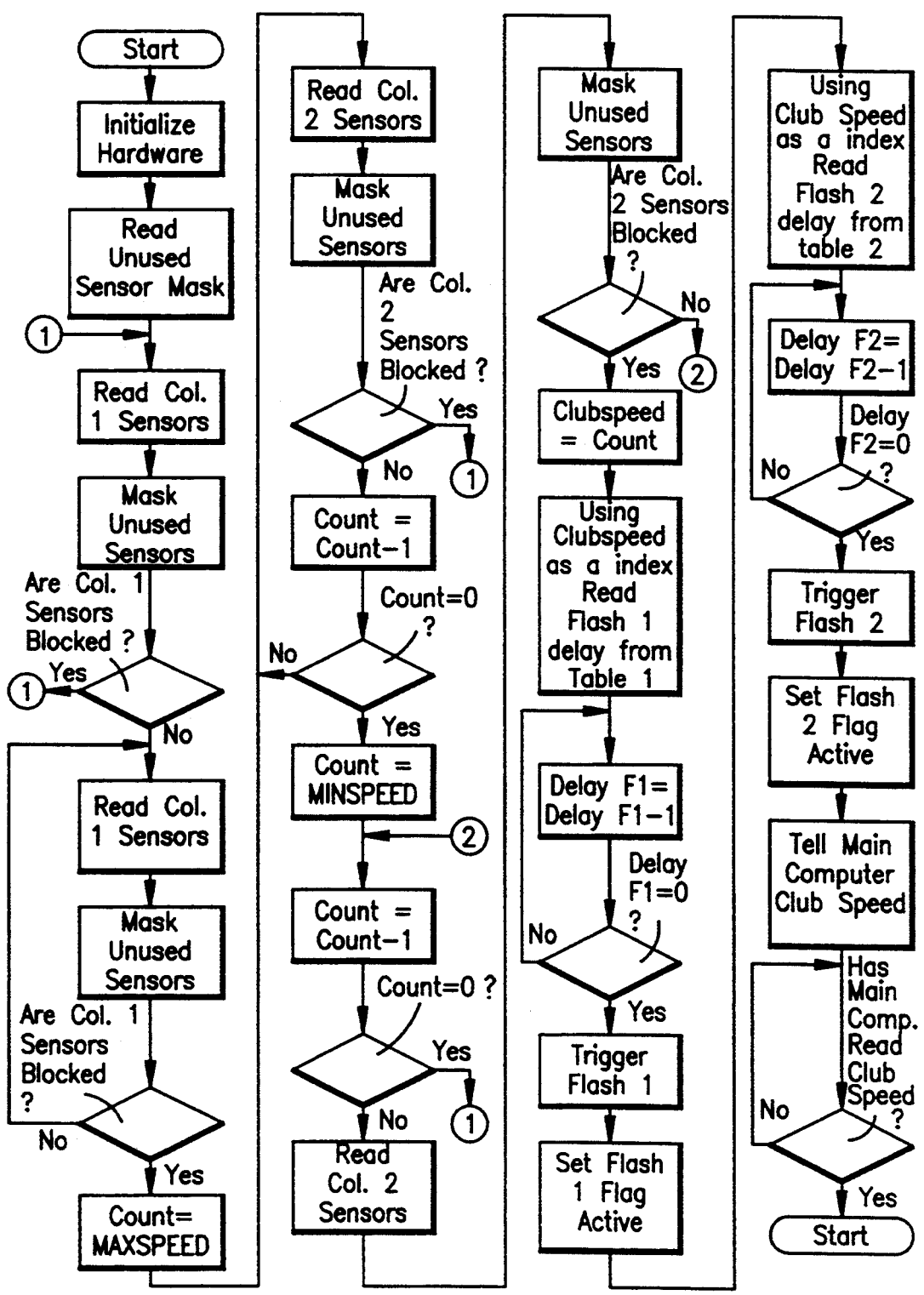
FIG. 5 is a flow chart of the software employed by the preferred embodiment to calculate club speed and actuate a flash unit for obtaining snapshots of a golfer's swing.

The interface control card 56 is programmed to both calculate the club speed during a swing and control the operation of the flash unit 38 during a swing so that the IR camera 30 can obtain two "snapshots" of the golfer's swing, one just before, and one just after, the club impacts the ball. The flow chart of the software employed by the interface control card 56 to accomplish these functions is illustrated in FIG. 5. To determine the club speed, the interface control card 56 monitors the optical sensor array 16 for detector blockage and computes the club speed from the blockage information. Since the distance between the two columns of photodetectors 20 and 22 is known, the club speed can be easily determined by measuring the time difference between the instant the club passes the first column 20 and the instant the club passes the second column 22. The club speed is then checked for a minimum MPH threshold value (e.g., 25 MPH) and a maximum threshold value (e.g., 140 MPH), and if the club speed falls between these two values, it is qualified.

The interface control card 56 also provides trigger timing for the IR flash unit 38 and the frame grabber 52, and provides control of the video multiplexer 84 which will be discussed in greater detail in conjunction with the swing capture subsystem. To insure that false triggering of the photodetectors will not occur, the interface control card 56 uses the ball qualified x-y position to activate only one pair of the photodetectors from each of the columns 20 and 22, these being the two pairs of photodetectors whose y-position is closest to the ball's y-position and the distance from the left edge of the ball to the mean x-position of the second column 22 of the photodetectors.

The calculated distance from the left edge of the ball to the mean x-position of the second column 22 of photodetectors is also used to calculate two delay tables which are downloaded into the interface control card's 56 memory from the main system software. The first table is calculated using speeds from 25 MPH to 140 MPH at 1 MPH increments as an index to a column of delay values corresponding to the speed information. For example, if the club speed is 25 MPH and it must travel 3 inches before it hits the left edge of the golf ball, the delay time is equal to 6.8 milliseconds (3 inches 25 × (17.6 in/sec.)). Similarly, if the club speed is 140 MPH, the delay time is 1.4 milliseconds.

As illustrated in FIG. 5, the interface control card 56 first calculates the speed of the club and, if it is between the minimum and maximum speed, uses this speed to index into the first delay table to get a delay value. This delay is the time when the club has just tripped (approximately 50-100 microseconds) the second column of photodetectors 22, but just before impact of the club on the ball. At the end of the first time delay, the interface control card 56 triggers a first flash lamp 90 of the flash unit 38 which enables capture by the IR camera 30 of a snapshot of the club just before it impacts the ball.

The second delay table values are employed to actuate a second flash lamp 92 of the flash unit 38 at a time sufficient after the first flash to enable the club to travel approximately 8 inches. This distance provides enough separation from the position during the first flash image that the two images of the club will not overlay or blur into each other, but also insures that the second club and ball images will not be out of the frame capture view. Using the two delay tables and club speed as an index, the impact prior to the ball and the separation between club images will be constant, regardless of the club speed.

Figure 6:
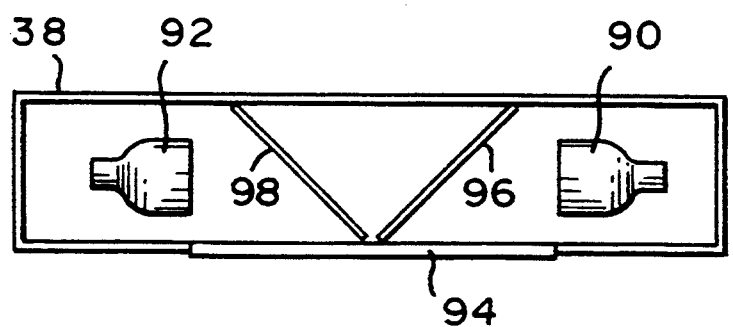
FIG. 6 is a diagrammatic illustration of a flash unit employed with the preferred embodiment.

Turning now to FIG. 6, it illustrates the construction of the flash unit 38 in greater detail. As shown, the two flash lamps 90 and 92 are positioned perpendicularly to an infrared filter or lens 94, and first and second mirrors 96 and 98 disposed at 45° angles are employed to reflect the light from each of the flash lamps 90 and 92 through the IR filter 94 and toward the hitting area 13 of the golf mat 12 as illustrated in FIG. 1.

Figure 7:
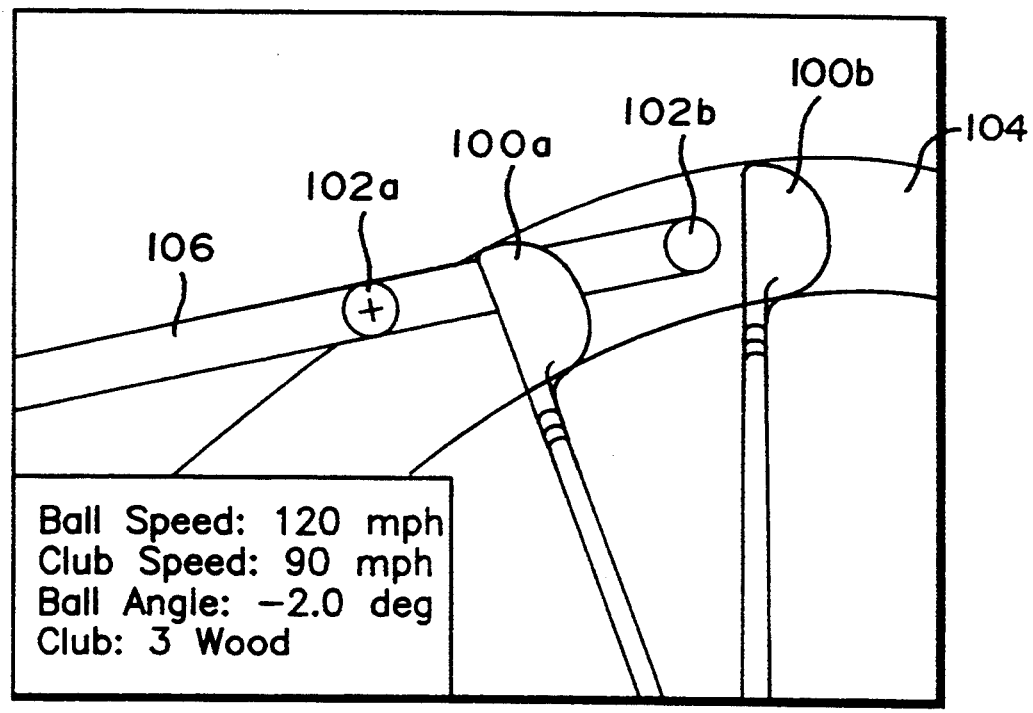
FIG. 7 is an illustration of a snapshot display image obtained with the preferred embodiment.

The resulting images obtained by the IR camera 30 during the two snapshots are overlaid and appear as illustrated in FIG. 7. During the first snapshot, the golf club and golf ball are shown as illustrated at 100b and 102b, respectively, while during the second snapshot, the club and ball are shown as illustrated at 100a and 102a, respectively (note the "+" sign displayed over the ball 102a). In addition, the club and ball paths are also shown in the image as indicated at 104 and 106, respectively, both of which can provide valuable information to the golfer or instructor. Finally, the computed ball speed, club speed and ball angle are displayed along with the club data in the lower left corner of the overlaid snapshot images.

The interface control card 56 will set a flag =1 right after the first flash of the flash unit 38 and flag =2 after the second flash of the flash unit 38. The interface control card 56 includes circuitry to monitor the vertical sync output of the IR camera 30 and cause a system interrupt at every vertical sync. The system software enables this vertical sync interrupt routine only during swing capturing mode after the ball has been qualified, the club detection subsystem has been armed and swing capturing storage mode has been enabled. The vertical sync interrupt routine reads the flag value set by the interface control card 56, and thereby has enough information to determine if the two flashes occurred in a single field or in two separate fields. This information is stored as an output flag which is checked by the system software when it finishes the swing capturing mode about 1 second after the club speed qualification. If the flashes occurred in two separate fields, the system software will subtract the two field's pixel values and add an offset to the resultant pixel values. If the two flashes occurred in a single field, no modification of the field information will be performed. The offset is used to adjust the image brightness of the two subtracted fields to match the brightness level of the single field.

Turning now to the swing capturing subsystem, it is employed to provide either real time or recorded views of a golfer's swing. Multiple views can be displayed simultaneously as illustrated in FIG. 4, or a single view can be displayed as desired. The subsystem is comprised of the color video cameras 24, 26 and 28, the video multiplexer 84, the video compression and decompression card 54 and part of the previously discussed interface control card 56. The top view camera 28 is mounted overhead approximately 10–11 feet above the golf mat 12 to obtain a field-of-view including the golfer's head, shoulders, arms, etc. The front view camera 26 is preferably mounted approximately 6–10 feet away from the golfer to obtain a front view of the golfer and his swing. Finally, the side view camera 24 provides a view of the right side of the golfer in-line with a target in the cage 14.

The video signals from the color cameras 24, 26 and 28 and the IR camera 30 are routed to the video multiplexer 84 which can be commanded to select any of the four views to be displayed, or the special quad mode presentation of the four views simultaneously. This control is done by the system software via the interface control card 56. The output of the video multiplexer 84 is routed to the video compression/decompression card 54 which is a generic card based on the C-Cube CL550 c/d chip, and can be C-Cube's JPEG Video Board card, for example. The compression/decompression card 54 can compress the video data 25 to 120 times, and this multiplication number is known as the Q factor. The quality of the image due to artifacts degrades with increasing Q factor, however, the memory space necessary for storing the images is obviously decreased. In the preferred embodiment, a Q factor of between 25 and 35 is selected so that a 3 to 4 second swing capture time can be stored in 1 to 2 megabytes of memory.

The video compression/decompression card 54 stores the compressed image data in the extended memory of the motherboard 46. The memory is configured as a 3 to 4 second storage time circular buffer, which can be increased or decreased through programming. The compressed image data fills the circular buffer until full, and then starts over again, thus overwriting previous information. This continues until the system software stops the compression storage. The circular buffer is preferably optimized in storage time so at the end of storage, the next memory location contains the first frame of the swing to be reviewed. This optimization was achieved by reviewing the swing time of different skill level golfers to determine a maximum swing time than is sufficient for most swing times, yet minimizes the dead time from start of playback to the time when the golfer actually starts to move into his or her back swing motion.

In playback, the compressed image data is retrieved from extended memory one frame at a time, and is fed back to the decompression circuitry of the video compression/decompression card 54 which decompresses the digital image data, and outputs it as a digital RGB signal to the RGB-to-S-Video converter 82. The S-video is then fed to the VCR 40 for recordation on video tape, and is also passed through to the TV monitor 72 for immediate viewing by the golfer.

Figure 8:
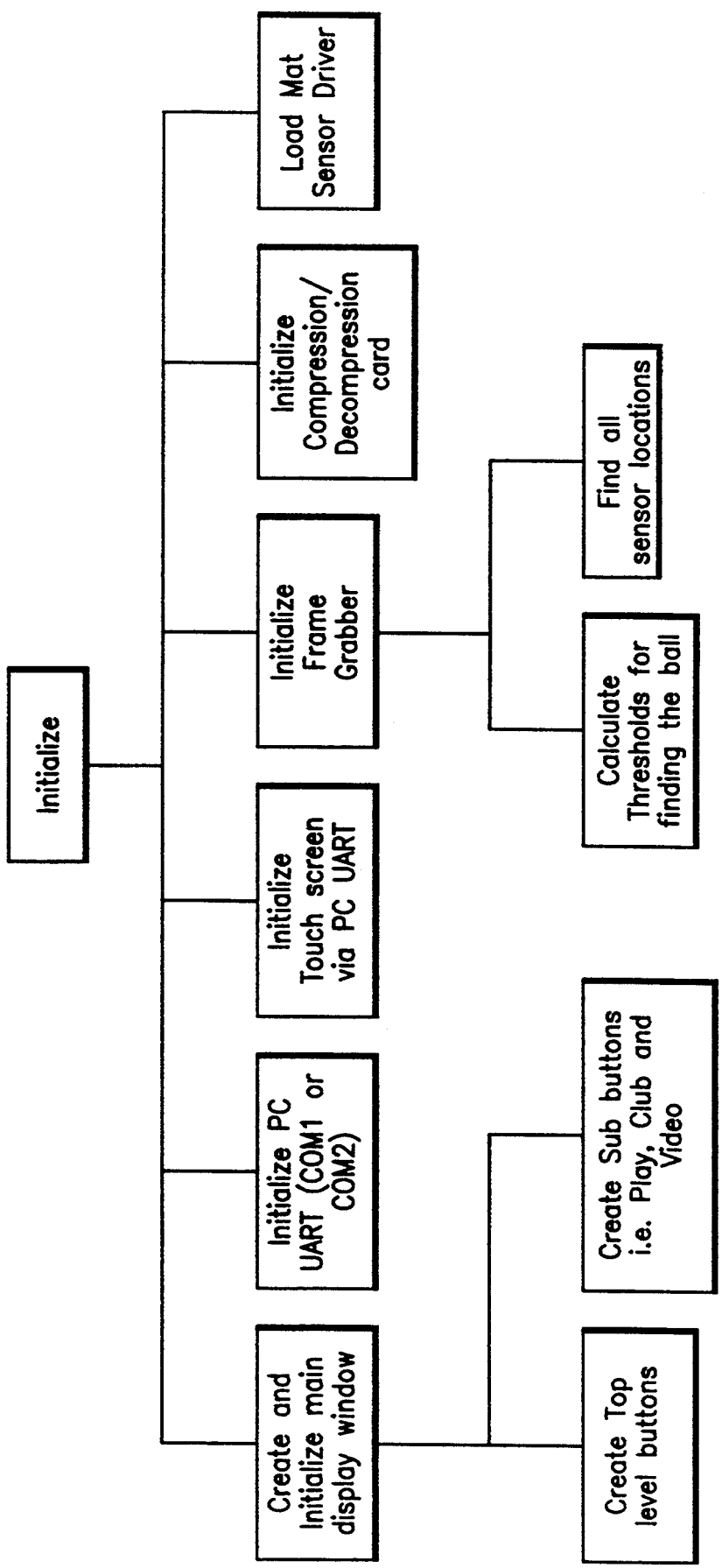
FIGS. 8–13 are block diagrams of software routines carried out by the preferred embodiment to initialize the system elements, locate a golf ball, record the swing images, play back the swing images, select a club and select a display view mode, respectively.

The step-by-step operation of the golf practice apparatus 10 will now be described. First, when the various elements of the apparatus 10, such as the video image processing and storage system 32, are turned on, an initialization routine is automatically carried out which performs the various functions illustrated in FIG. 8. During initialization, the frame grabber 52 grabs and digitizes a frame of video from the IR camera 30. The digitized video data is then used to calculate the threshold value for the golf mat 12 that is used by the ball finding routine to determine if there is a ball on the hitting area 13 of the mat 12. The video data is then analyzed to determine the location of each of the photodetectors in the first and second columns 20 and 22 in the optical sensor array 16. This location data is then used to calculate the scale factor (i.e., pixel/inch), and is also used in conjunction with the ball location information to determine which of the photodetectors in the two columns 20 and 22 will be activated to measure club speed and calculate the delay tables for triggering the flash unit 38.

Once all of the elements of the apparatus 10 have been initialized, the main routine displays the main menu on the video display 72 so that the golfer can and enter data on the club used for record keeping purposes and then choose the type of view display desired (e.g., one view or all views simultaneously).

Figure 9:
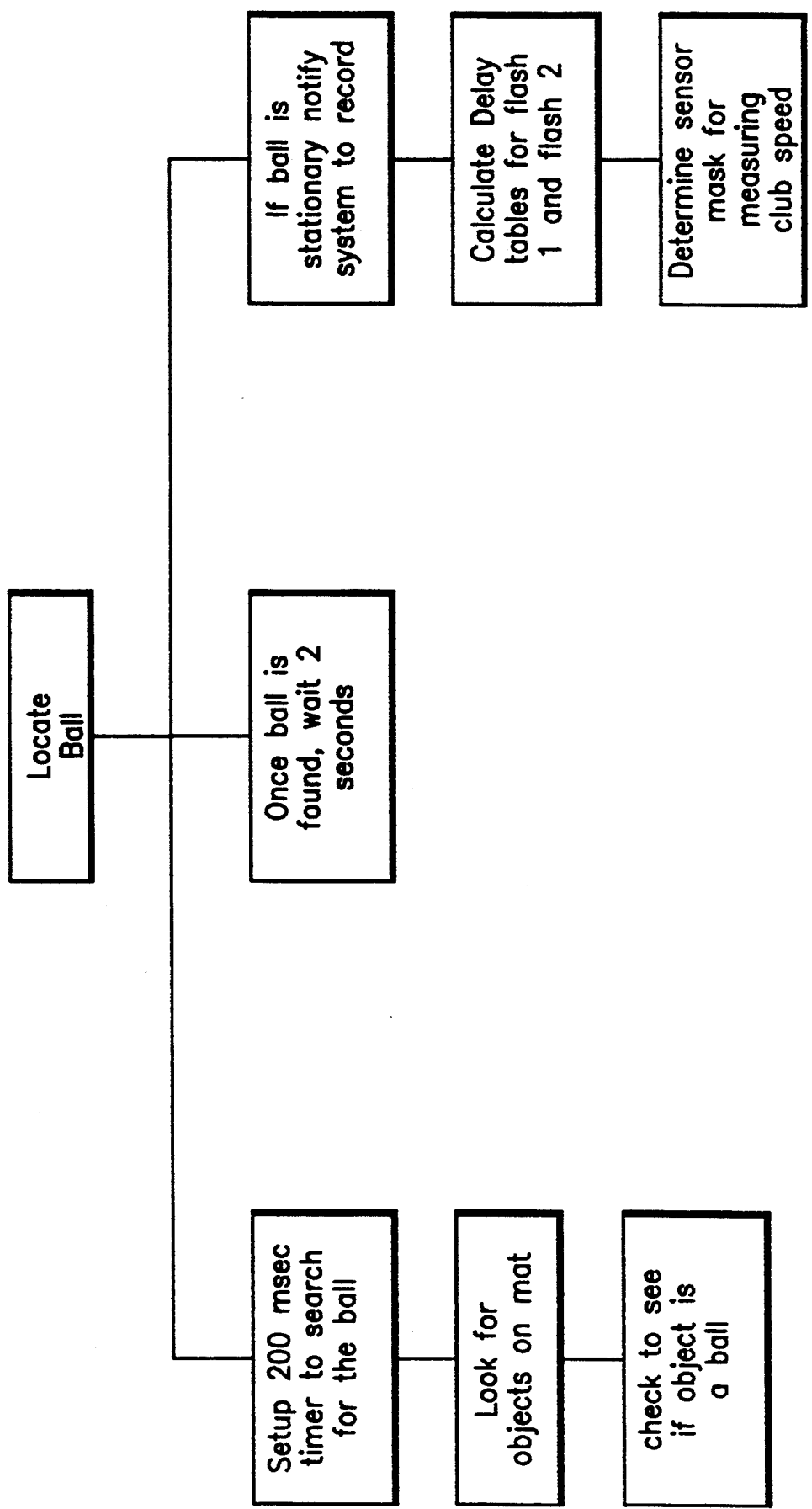

Next, the main routine activates the locate ball routine as illustrated in FIG. 9. This routine is made up of seven blocks, the first of which is a 200 millisecond ball search timer which is used to tell the main routine to call the locate ball routine every 200 milliseconds. When the locate ball routine is called, it commands the frame grabber 52 to capture one frame of video from the IR camera 30. Captured digitized video data is then analyzed to determine if there are any objects on the golf mat 12 that are above the threshold level. If an object is found, the data is analyzed to determine if the object is a golf ball. When it is determined that a golf ball has been found, the location of the ball is saved and a 2 second timer is started. The next time the locate ball routine is called by the main routine, it checks to see if the ball is still at the same location. If the ball remains in the same location and the 2 second timer expires, then the locate ball routine will notify the main routine that the ball has been found. The ball location data is then used to calculate the delay tables for activating the flash unit 38, and it is also used to determine which of the photodetectors in the two columns 20 and 22 should be activated to measure club speed.

Figure 10:
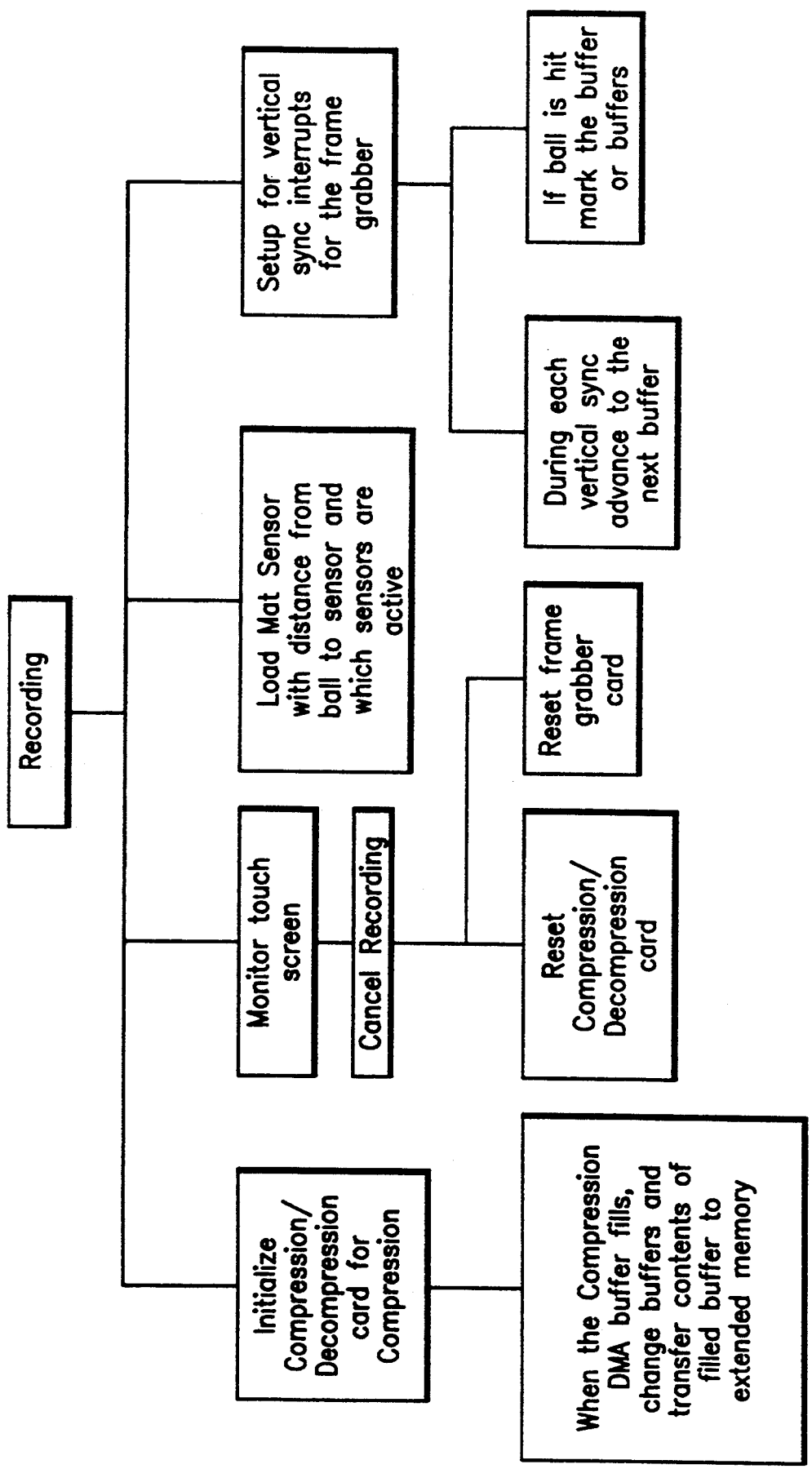

Once the main routine has been notified that a ball is present in the hitting area 13 of the golf mat 12, the recording process is started. This process is accomplished by calling the recording routine which is illustrated in FIG. 10. The recording routine first initializes the compression/decompression card 54 for compression mode. It then sets up a circular buffer in main memory to store approximately 3 seconds worth of video data, 3 seconds being the average time for a golf swing. Next, a background routine called by DMA interrupt is started that moves the compressed video from the DMA buffer in the compression/decompression card 54 to the circular buffer in main memory.

During the recording process, the touch screen 68 is also monitored to see if the cancel button has been activated and if so, the recording process is terminated by resetting the compression/decompression card 54 and the frame grabber 52, and returning to the main routine.

The recording routine also writes the delay tables and sensor mask to the interface control card 56 so that they can be used to measure the club speed and control the IR flash unit 38.

The recording routine also sets up and enables vertical sync interrupts from the frame grabber 52. During each vertical sync interrupt, the active frame buffer is advanced to the next buffer (the frame grabber memory is divided into four buffers which are rotated so that the last four frames from the IR camera 30 are stored), then the interface control card 56 is checked to see if either of the IR flash lamps have been triggered. If the flash lamps have been triggered, the current frame buffer is marked to signify that it contains the snapshot video data. If the snapshots occur in more than two frames, both frames are marked.

After the ball has been hit as signified by the club speed qualification and both flash lamps 90 and 92 of the flash unit 38 being triggered, the recording process stores an additional 1 second of compressed video data in the circular buffer, and then returns to the main routine.

The main routine then reads the marked buffer or buffers from the frame grabber 52 (if there are two buffers, they will be subtracted from each other to form a single buffer with both flash images), converts the data to a bit map image and writes it into the main display window.

Next, the main routine processes the compressed video data in the circular buffer in main memory. This consists of creating a data structure that contains the starting location and length of each video frame stored in the circular buffer. The data structure can then be used by the play routine to access and decompress individual video frames.

Figure 11:
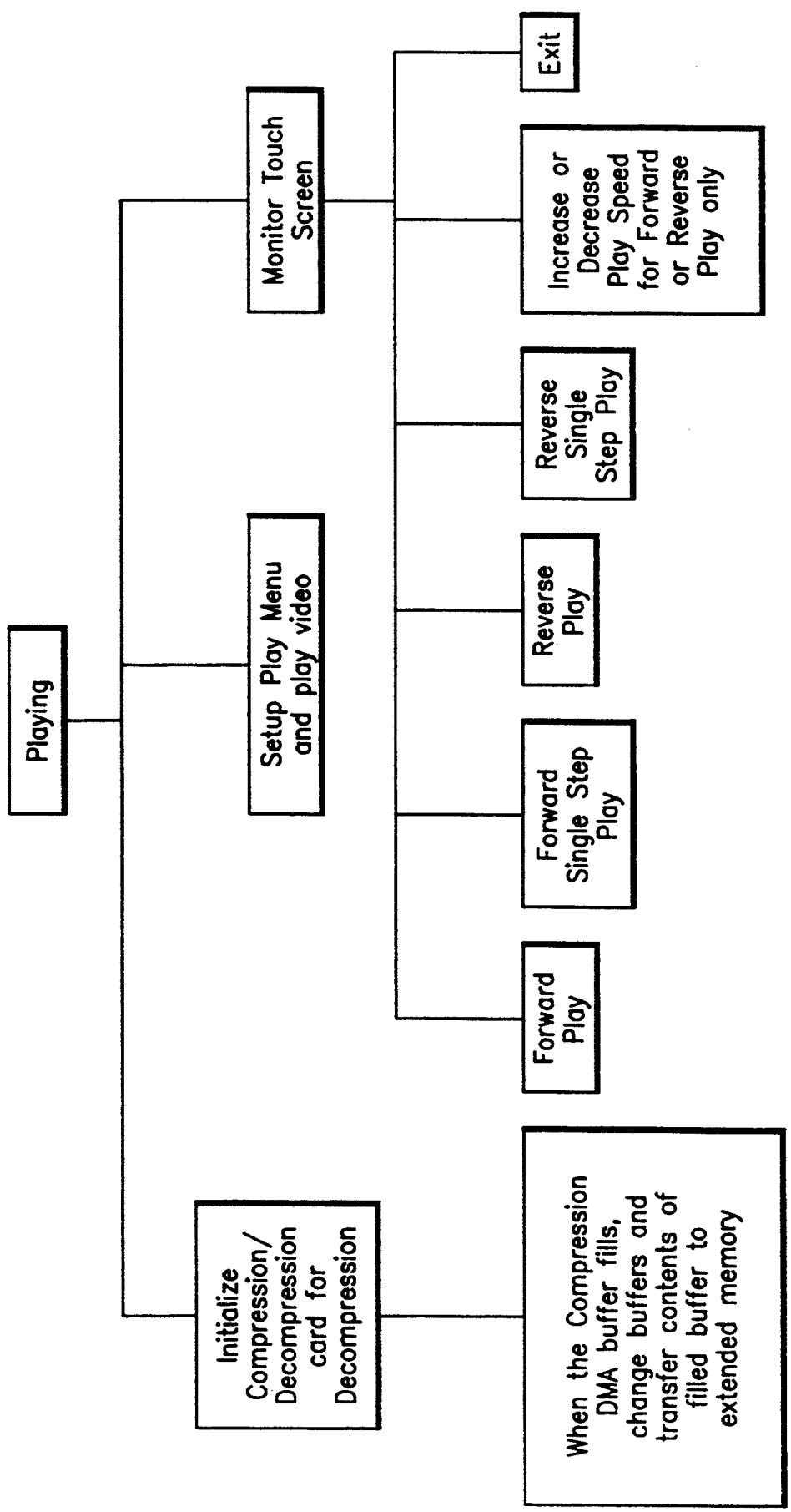

While the main menu is being displayed, the main routine monitors the touch screen to determine if any buttons have been activated by the user. If a valid button has been activated, then the main routine calls the corresponding routine. For example, when the play button is selected, the main routine calls the playing routine whose functions are illustrated in FIG. 11. In particular, the playing routine initializes the compression/decompression card 54 for decompression. It then sets up a DMA service routine to move compressed video data from the circular buffer in main memory into the DMA buffer which writes the data out to the compression/decompression card 54 for display. Next, the play menu is set up and displayed, and video data is played back. In the preferred embodiment, the compression/decompression card 54 enables the video images to be played back at various speeds including 20%, 60% and 100% of normal speed. The speeds are programmable from 0 to 100% and are chosen by the speed button. The default play mode is forward played at 20% normal speed, or whatever the last speed setting was.

The play routine continues playing back the video data in the circular buffer over and over until it receives a command from the touch screen. These commands include forward play, forward single step, reverse play, reverse single step, replay speed control and exit. The play routine responds to the various commands when received, and will terminate and return to the main routine when the exit command is received. For example, if the golfer chooses the forward single step control button, the swing replay will pause. If the button is touched again and released, the swing replay will advance one frame forward. If the button is touched and not released, the swing replay will continue forward until the button is released. With this type of control, the golfer or instructor can easily advance and stop at any portion of the swing motion for closer examination.

Figure 12:
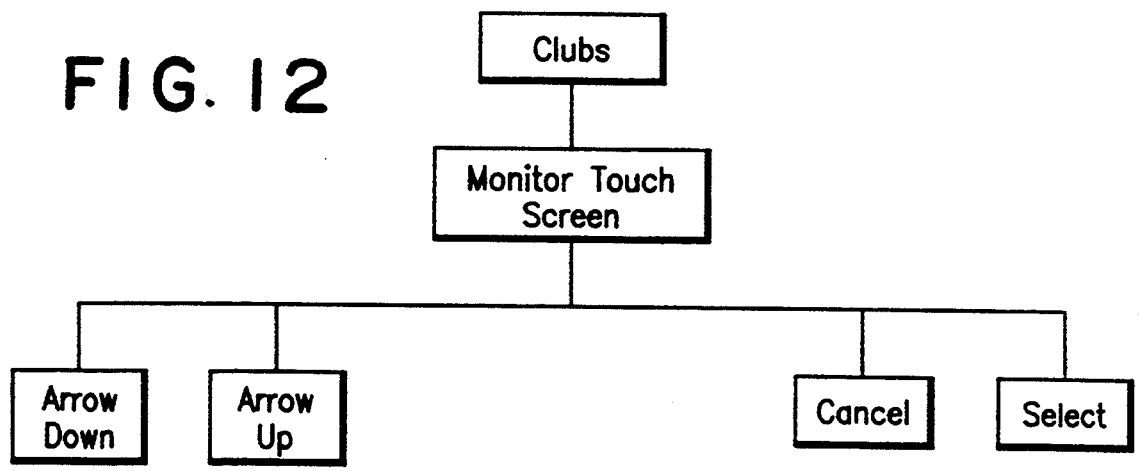

When the clubs button from the main menu is selected, the main routine calls the clubs selection routine as illustrated in FIG. 12 which simply enables a golfer to enter the designation of the club being used (e.g., 3 wood). This information is subsequently displayed along with the ball speed, club speed and ball angle information as illustrated in FIG. 7.

Figure 13:
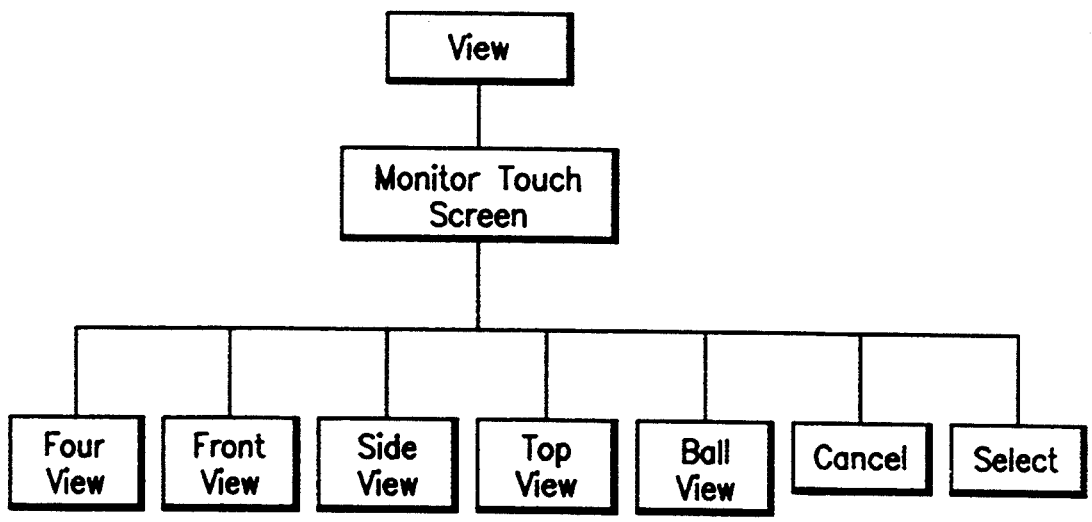

When the view button from the main menu is selected, the view selection routine is called as illustrated in FIG. 13 which sets up the view menu on the video monitor 72, and then monitors the touch screen 68 for input. The video view menu is made up of seven buttons including four view, front view, side view, top view, ball view, cancel and select. If any of the view buttons are activated, the view selection routine changes to that view and waits for more input from the touch screen. If the select button is activated, the view selection routine keeps the current view and returns to the main routine. Finally, if the cancel button is selected, the view selection routine restores the view that was activated before the view selection routine was called, and then returns to the main routine.

During use of the golf practice apparatus 10, a practicing golfer will find that the apparatus is very easy, quick and convenient to use. In particular, once the system has been initialized (i.e., turned on) and the golfer enters the desired club and view information with the handle of the golf club on the touch screen 68, the golfer places a ball on the golf mat 12. The IR camera 30 and the image processing software discussed previously, detects the ball and the image recording process is automatically initiated. Video images from the color cameras 24, 26 and 28 are now processed by the video compression/decompression card 54 and stored in the circular buffer memory as the golfer swings the club. The two before and after snapshots are also recorded by the IR camera 30 and stored in accordance with the signals generated by the two columns of photodetectors 20 and 22 and the processing software discussed previously. The ball speed, club speed and ball angle are also calculated from the signals generated by the two columns of photodetectors 20 and 22, and the two snapshot images obtained by the IR camera 30.

Once the golfer completes his or her swing, the play button is selected, and the stored images are replayed virtually instantaneously in the selected format (e.g., forward, reverse, slow motion, etc.). The VCR 40 is employed not only to simultaneously record the golfer's swing as it occurs, but also to record the playback of the swing and any associated audio.

In conclusion, the present invention provides an apparatus for video storage and replay of a golfer's swing which is very easy and quick to use, and is very versatile. The touch screen input provides an easy means by which the golfer can enter selections and commands through use of a golf club handle, while the ball detection responsive recording means eliminates the need for the golfer to start and stop a recording mechanism. The use of digital processing and storage of the obtained images not only enables the video data to be accessed and replayed very quickly without any of the delay associated with conventional video tape recording equipment, but also provides the versatility of variable speed and direction playback, selective view display and display of calculated data on club speed, ball speed and ball angle.

Although the invention has been disclosed in terms of a preferred embodiment, it will be understood that numerous variations and modifications could be made thereto without departing from the scope of the invention as defined by the following claims. One such variation or modification is the operational mode of the apparatus which can be changed as desired. For example, the selected stored camera view can be replayed automatically and when the exit button is pressed, the before and after snapshot can then be displayed. As mentioned before, the number of cameras and types of camera angles used to capture or store data can also be changed. Cameras can be located at any angle as desired by the operator to obtain a better viewing area or views of greater interest. Zoom lenses can also be employed to focus closer attention on the details of the golfer, such as their hands at the time of impact, etc.

What is claimed is:

1. An apparatus for recording and providing instant playback of video images of a golfer's swing comprising:
   a) a hitting area for receiving a golf ball to be driven;
   b) video camera means positioned near and aimed at said hitting area for obtaining video images of a golfer during a swing at a ball on said hitting area;
   c) digital video image processing and storage means for receiving and storing video images from said video camera means;
   d) means responsive to the placement of a ball on said hitting area to initiate processing and storage of video images from said video camera means by said video image processing and storage means;
   e) display means connected to said digital video image processing and storage means for instantly displaying stored video images of a golfer's swing; and
   f) input means connected to sad digital video image processing and storage means for controlling operation of said apparatus;
   g) wherein said means to initiate storage of video images responsive to placement of a ball on said hitting area comprises second video camera means aimed at said hitting area, and image processing software in said video image processing and storage means for analyzing images obtained by said second video camera means and determining therefrom if a golf ball has been positioned on said hitting area, and means to initiate the storage of video images if it is determined that a golf ball has been placed on the hitting area.

2. The apparatus of claim 1, wherein said video camera means further comprises a plurality of video cameras positioned at different locations around the hitting area for obtaining different views of a golfer's swing simultaneously, and wherein said digital video image processing and storage means further includes video multiplexer means for receiving images from said plurality of video cameras.

3. The apparatus of claim 2, wherein three said video cameras are provided, one positioned above the hitting area for obtaining a top view of a golfer and the hitting area during a swing, a second camera positioned in front of the hitting area for obtaining a front view of a golfer during a swing and a third camera positioned to one side of the hitting area for obtaining a side view of a golfer during a swing.

4. The apparatus of claim 1, further including means to obtain and store snapshot images in said digital video image processing and storage means of a golf club and ball just before and just after the club hits the ball during the golfer's swing.

5. The apparatus of claim 1, wherein said video image processing and storage means includes video compression/decompression circuitry for compressing video swing image data prior to storage, and decompressing stored data prior to display to reduce the amount of storage space necessary to store video data of a complete golf swing.

6. The apparatus of claim 5, wherein said video image processing and storage means includes a video image data memory configured as a circular buffer to increase accessibility of the image data in memory.

7. The apparatus of claim 6, wherein said circular buffer includes enough storage space for storing approximately three seconds of video images obtained by said video camera means.

8. The apparatus of claim 1, wherein said video image processing and storage means includes a video image data memory configured as a circular buffer to increase accessibility of the image data in memory.

9. The apparatus of claim 8, wherein said circular buffer includes enough storage space for storing approximately three seconds of video images obtained by said video camera means.

10. The apparatus of claim 1, wherein said input means comprises a touch screen positioned over said display means for selecting functions displayed on said display means.

11. The apparatus of claim 10, wherein said touch screen and said display means are positioned adjacent said hitting area so that said touch screen can be actuated with the handle of a golf club by a golfer standing adjacent the hitting area.

12. The apparatus of claim 1, further including means to display stored video images on said display means in a plurality of modes, including forward play, reverse play and stop motion.

13. The apparatus of claim 2, wherein said video image processing and storage means includes means to display images from said plurality of video cameras on said display means in different modes, including single view, simultaneous plural view, forward play, reverse play and stop motion.

14. The apparatus of claim 1, further including a video tape recorder connected to said image processing and storage means to record both video images while they are being obtained by said video camera means, and video images as they are being played back by said video image processing and storage means.

15. The apparatus of claim 14, further including an audio microphone connected to said video tape recorder for recording audio during a golf swing recording and playback session.

16. An apparatus for recording and providing instant playback of video images of a golfer's swing comprising:
   a) a hitting area for receiving a golf ball to be driven;
   b) video camera means positioned near and aimed at said hitting area for obtaining video images of a golfer during a swing at a ball on said hitting area;
   c) digital video image processing and storage means for receiving and storing video images from said video camera means;

d) means responsive to the placement of a ball on said hitting area to initiate processing and storage of video images from said video camera means by said video image processing and storage means;
e) display means connected to said digital video image processing ad storage means for instantly displaying stored video images of a golfer's swing;
f) input means connected to said digital video image processing and storage means for controlling operation of said apparatus; and
g) means to obtain and store snapshot images in said digital video image processing and storage means of a golf club and ball just before and just after the club hits the ball during the golfer's swing;
h) wherein said means to obtain snapshot images further comprises:
i) an optical sensor array portioned adjacent said hitting area for detecting passage of a golf club head toward a ball on said hitting area during a swing, said sensor array including first and second parallel columns of photodetectors spaced from one another by a preset distance and being connect to said video image processing and storage means;
ii) second video camera means positioned above, and aimed downwardly at, said hitting area for obtaining said snapshot images, said second video camera means also bing connected to said video image processing and storage means;
iii) a flash unit positioned adjacent and aimed at said hitting area for illuminating said hitting area with periodic flashes so that said second video camera means can obtain snapshots of said hitting area, said flash unit also being connected to said video image processing and storage means; and
iv) means in said video image processing and storage means responsive to signals generated by said first and second columns of photodetectors to calculate the speed of a golf club head as it passes the sensor array and trigger the flash unit to flash just before and just after the golf club strikes a ball on the hitting area.

17. The apparatus of claim 16, wherein said second video camera means is responsive only to infrared radiation, and said flash unit provides only infrared flashes so that the flashes will not be distracting to a golfer during a swing.

18. The apparatus of claim 16, wherein said video image processing and storage means further includes means to calculate the speed and flight angle of a golf ball after it has been hit by analyzing the relative positions of the golf ball in the first and second snapshots, and wherein, the calculated club speed, ball speed and ball angle can be displayed on said display means along with said snapshots and the video images obtained by said video camera means.

* * * * *